United States Patent [19]

Seiler et al.

[11] Patent Number: 4,866,162
[45] Date of Patent: Sep. 12, 1989

[54] FIBER-REACTIVE FLUORO-TRIAZINE CONTAINING DYESTUFF

[75] Inventors: Herbert Seiler, Riehen; Gert Hegar, Schönenbuch, both of Switzerland

[73] Assignee: Ciba-Geigy Corporation, Ardsley, N.Y.

[21] Appl. No.: 914,556

[22] Filed: Oct. 2, 1986

Related U.S. Application Data

[63] Continuation of Ser. No. 728,112, Apr. 29, 1985, abandoned, which is a continuation of Ser. No. 604,803, Apr. 27, 1984, abandoned, which is a continuation of Ser. No. 408,564, Aug. 16, 1982, abandoned, which is a continuation of Ser. No. 179,318, Aug. 18, 1980, abandoned, which is a continuation of Ser. No. 940,687, Sep. 8, 1978, abandoned.

[30] Foreign Application Priority Data

Sep. 12, 1977 [LU] Luxembourg ............... 78 115

[51] Int. Cl.⁴ .............. C09B 62/85; C09B 62/95; D06P 1/382; D06P 3/66
[52] U.S. Cl. ................... 534/632; 534/598; 534/622; 534/638
[58] Field of Search .................. 534/632, 638

[56] References Cited

U.S. PATENT DOCUMENTS 3,627,749 12/1971 Ackermann et al. ............ 534/628
4,038,367 7/1977 Sueda et al. .................... 534/628
4,115,378 9/1978 Bien et al. ...................... 534/628
4,128,544 12/1978 Schneider ....................... 534/628

FOREIGN PATENT DOCUMENTS 1644208 9/1970 Fed. Rep. of Germany ...... 534/628
2657341 6/1977 Fed. Rep. of Germany ...... 534/628
1188606 4/1970 United Kingdom ............... 534/628
1366097 9/1974 United Kingdom ............... 534/628

*Primary Examiner*—Floyd D. Higel
*Attorney, Agent, or Firm*—Edward McC. Roberts

[57] ABSTRACT

Azo dyes of the formula

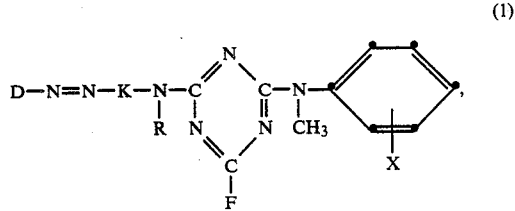

(1)

wherein D is a disulfonaphthyl-(2) residue, K is a naphtalene or benzene residue, R is hydrogen, and X is hydrogen, are especially suitable for dyeing of cellulosic materials of fibrous structure, they have a good exhaustion capacity and excellent dye fixation.

3 Claims, No Drawings

FIBER-REACTIVE FLUORO-TRIAZINE CONTAINING DYESTUFF

This application is a continuation of application Ser. No. 728,112, filed Apr. 29, 1985, which is a continuation of application Ser. No. 604,803, filed Apr. 27, 1984, which is a continuation of application Ser. No. 408,564, filed Aug. 16, 1982, which is a continuation of application Ser. No. 179,318, filed Aug. 18, 1980, which is a continuation of application Ser. No. 940,687, filed Sept. 8, 1978, all now abandoned.

The present invention relates to azo dyes of the formula

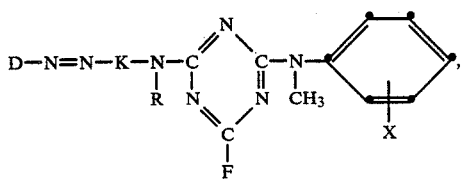

wherein D is a naphthalene radical, K is the radical of a coupling component, R is hydrogen or methyl, and X is hydrogen, methyl or ethyl, and also to heavy metal complexes thereof.

The radicals D and K can contain the customary substituents of azo dyes. In particular, the radicals D and K contain sulfonic acid groups as further substituents.

Preferred azo dyes are those of the formula (1) wherein D is a disulfonaphthyl-(2) radical, K is a naphthalene or benzene radical, R is hydrogen and X is hydrogen.

Important subgroups of the preferred azo dyes of the formula (1) are:

(a) Azo dyes of the formula

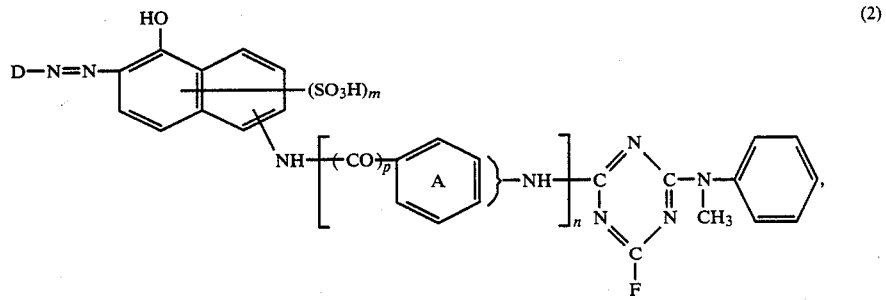

wherein D is a disulfonaphthyl-(2) radical, m is 1 or 2, n is 0 or 1 and p is 0 or 1, and the benzene radical A can contain further substituents, and (b) azo dyes of the formula

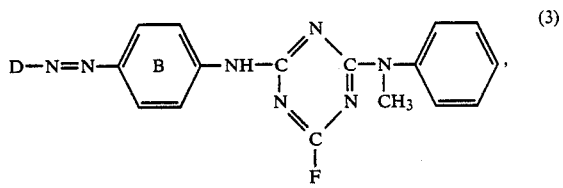

wherein D is a disulfonaphthyl-(2) radical, and the benzene radical B can contain further substituents.

The disulfonaphthyl-(2) radicals D and the benzene radicals A and B in the formulae (2) and (3) can contain for example the following groups and atoms as further substituents in addition to $SO_3H$ groups: alkyl groups of 1 to 4 carbon atoms, such as methyl, ethyl and propyl; alkoxy groups of 1 to 4 carbon atoms, such as methoxy, ethoxy, propyloxy and isopropyloxy; acylamino groups of 1 to 6 carbon atoms, such as acetylamino, propionylamino and benzoylamino; amino groups, such as $-NH_2$, methylamino and ethylamino; the ureido, hydroxyl and carboxyl group; and halogen, such as fluorine, chlorine and bromine.

If the radicals D, K and B contain complex-forming groups, such as hydroxyl, carboxyl, amino and sulfo groups, it is also possible to obtain the heavy metal complexes of the dyes of the formula (1), (2) and (3). Suitable complex-forming heavy metals are preferably chromium, cobalt, nickel and copper.

Valuable azo dyes of the formula (1) are those of the formulae

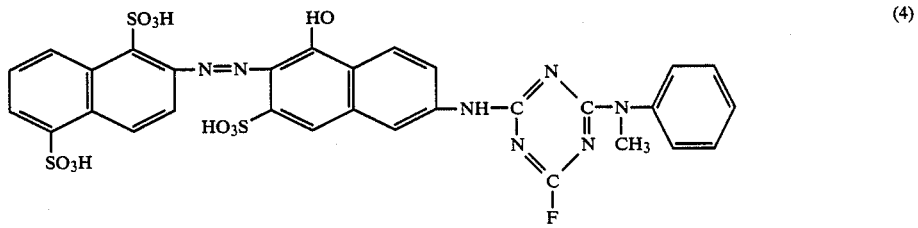

[subgroup a)]

-continued

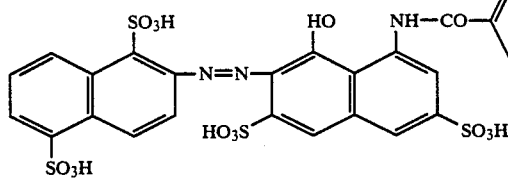 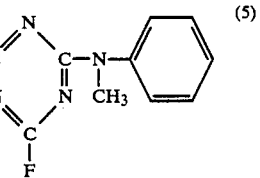   (5)

[subgroup a)]

and

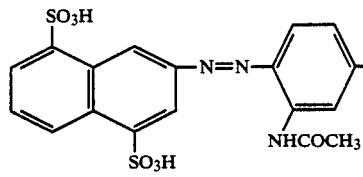   (6)

[subgroup b)]

The azo dyes of the formula (1) are fibre-reactive as they contain a removable fluorine atom in the s-triazine radical.

By fibre-reactive compounds are ment those which are able to react with the hydroxyl groups of cellulose or with the amino groups of natural or synthetic polyamides to form covalent chemical bonds.

The azo dyes of the formula (1) are obtained by reacting, in any order, a diazotised amino compound of the formula

   (7)

a coupling component of the formula

   (8)

2,4,6-trifluoro-s-triazine of the formula

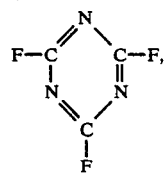   (9)

and an aminobenzene of the formula

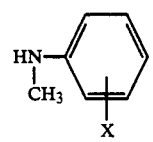   (10)

by coupling and condensation, to give an azo dye of the formula (1).

Preferably there are used starting materials of the formulae (7), (8) and (10), wherein D is a disulfonaphthyl-(2) radical, K is a naphthalene or benzene radical, R is hydrogen, and X is hydrogen.

The azo dyes of the subgroup (a) of the formula (2) are obtained by reacting in any order, a diazotised amino compound of the formula

   (7)

a coupling component of the formula

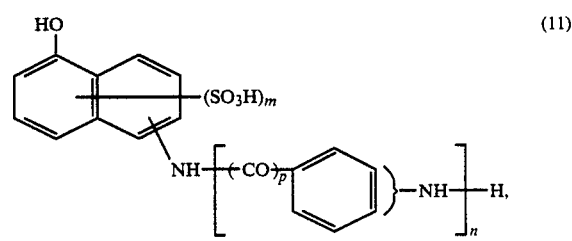   (11)

2,4,6-trifluoro-1,3,5-triazine of the formula (9) and an aminobenzene of the formula

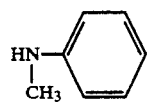   (12)

by coupling and condensation, to give an azo dye of the formula (1).

The azo dyes of the subgroup (b) of formula (3) are obtained by reacting, in any order, a diazotised amino compound of the formula (7), a coupling component of the formula

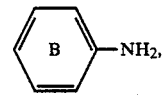   (13)

2,4,6-trifluoro-s-triazine of the formula (9) and an aminobenzene of the formula (12), by coupling and condensation to give an azo dye of the formula (1).

If the end dyes of the formulae (1), (2) or (3) contain complex forming groups, they can subsequently be reacted with heavy metal donors.

As the order in which the individual process steps referred to above are carried out can vary and, if desired, can also in some cases be carried out simultaneously, different variants of the process are possible.

In general, the reaction is carried out stepwise in succession and the sequence of the simple reactions between the individual reaction components of the formulae (7), (8), (9) and (10) can be freely chosen.

Important process variants for obtaining the dyes of the formula (1) comprise:

(1) coupling a diazotised amino compound of the formula (7) with a coupling component of the formula (8) to give an azo compound, condensing this azo compound with 2,4,6-trifluoro-s-triazine of the formula (9), and condensing the resulting primary condensation product with an aminobenzene of the formula (10) to give an azo dye of the formula (1);

(2) coupling a diazotised amino compound of the formula (7) with a coupling component of the formula (8) to give an azo compound, condensing 2,4,6-trifluoro-s-triazine of the formula (9) with an aminobenzene of the formula (10), and condensing the resulting primary condensation product with the above azo compound to give an azo dye of the formula (1);

(3) condensing a coupling component of the formula (8) with 2,4,6-trifluoro-s-triazine of the formula (9), condensing the resulting primary condensation product with an aminobenzene of the formula (10), and coupling the secondary condensation product thereby obtained to a diazotised amino compound of the formula (7) to give an azo dye of the formula (1);

(4) condensing a coupling component of the formula (8) with 2,4,6-trifluoro-s-triazine of the formula (9), coupling a diazotised amino compound of the formula (7) to the resulting primary condensation product, and condensing the azo compound thereby obtained with an aminobenzene of the formula (10) to give an azo dye of the formula (1);

(5) condensing 2,4,6-trifluoro-s-triazine of the formula (9) with an aminobenzene of the formula (10), condensing the resulting primary condensation product with a coupling component of the formula (8), and coupling a diazotised amino compound of the formula (7) to the secondary condensation product thereby obtained to give an azo dye of the formula (1).

The especially valuable azo dyes of the formulae (4), (5) and (6) are preferably obtained by process variant (1) by:

diazotising 2-amino-naphthalene-1,5-disulfonic acid and coupling it to 2-amino-5-hydroxynapathalene-7-sulfonic acid, condensing the resulting azo compound with 2,4,6-trifluoro-s-triazine, and replacing a fluorine atom at the s-triazine ring by a N-methylphenylamino group by condensation with N-methyl-aminobenzene [formula (4)];

diazotising 2-aminonaphthalene-1,5-disulfonic acid and coupling it to 1-(4'-aminobenzoylamino)-8-hydroxynaphthalene-3,6-disulfonic acid, condensing the resulting azo compound with 2,4,6-trifluoro-s-triazine, and replacing a fluorine atom at the s-triazine ring by a N-methylphenylamino group by condensation with N-methylaminobenzene [formula (5)];

diazotising 2-aminonaphthalene-4,8-disulfonic acid and coupling it to 1-amino-3-acetylaminobenzene, condensing the resulting azo compound with 2,4,6-trifluoro-s-triazine and replacing a fluorine atom at the s-triazine ring by a N-methylphenylamino group by condensation with N-methylaminobenzene [formula (6)].

The following compounds may be cited as starting materials which can be used for the production of the azo dyes of the formula (1):

Amino compounds of the formula (7) (diazo components)

1-aminonaphthalene-2-, -4-, -5-, -6-, -7- or -8-sulfonic acid,
2-aminonaphthalene-1-, -5- or -6-sulfonic acid,
1-aminonaphthalene-3, 6- or -5,7-disulfonic acid,
2-aminonaphthalene-1,5-, -1,7-, -3,6-, -5,7-, -4,8- or -6,8-disulfonic acid,
1-aminonaphthalene-2,5,7-trisulfonic acid,
2-aminonaphthalene-1,5,7-, -3,6,8- or -4,6,8-trisulfonic acid,
1-amino-2-hydroxy-6-nitronaphthalene-4-sulfonic acid,
2-amino-1-hydroxynaphthalene-4,8-disulfonic acid.

Coupling components of the formula (8)

aminobenzene,
N-methyl-, N-ethyl- or N-butylaminobenzene,
1-amino-2- or -3-methylbenzene,
1-methylamino-3-methylbenzene,
1-ethylamino-3-methylbenzene,
1-amino-2,5-dimethylbenzene,
1-amino-2,5-diethylbenzene,
1-amino-2- or -3-methoxybenzene,
1-amino-2- or -3-ethoxybenzene,
1-amino-2,5-dimethoxybenzene,
1-amino-2,5-diethoxybenzene,
1-amino-3-acetylaminobenzene,
1-amino-3-ureidobenzene,
1-amino-3-hydroxyacetylaminobenzene,
1-amino-3-sulfoacetylaminobenzene,
1-amino-3-methyl-6-methoxybenzene,
1-amino-3-acetylamino-6-methylbenzene,
1-amino-3-acetylamino-6-methoxybenzene,
1-amino-3-ureido-6-methylbenzene,
1-amino-2-methoxy-5-methylbenzene,
1-aminonaphthalene
1-aminonaphthalene-6, -7- or -8-sulfonic acid,
1-amino-2-methoxy-naphthalene-6-sulfonic acid,
1-(3'- or 4'-aminophenyl)-3-methylpyrazolone-(5),
1-(3'- or 4'-aminophenyl)-pyrazolone-(5)-3-carboxylic acid,
1-(2'-sulfo-4'-aminophenyl)-3-methylpyrazolone-(5),
1-(β-aminoethyl)-3-cyano-4-sulfomethyl-6-hydroxypyridone-(2),
1-(β-aminoethyl)-3-sulfomethyl-4-methyl-5-carbamoyl-6-hydroxypyridone-(2),
1-ethyl-3-acetylaminomethyl-4-methyl-6-hydroxypyridone-(2),
1-ethyl-3-(4'-aminophenyl)-sulfomethyl-4-methyl-6-hydroxypyridone-(2),
2-amino-6-hydroxynaphthalene-8-sulfonic acid,
1-amino-5-hydroxynaphthalene-2,7-disulfonic acid,
2-amino-5-hydroxynaphthalene-3,7-disulfonic acid,
1-amino-5-hydroxynaphthalene-3,7-disulfonic acid,
2-amino-5-hydroxynaphthalene-7-sulfonic acid,
2-methyl- or 2-ethylamino-5-hydroxynaphthalene-7-sulfonic acid,
2-(N-acetyl-N-methylamino)-5-hydroxynaphthalene-7-sulfonic acid,
2-acetylamino-5-hydroxynaphthalene-7-sulfonic acid, 2-amino-5-hydroxynaphthalene-1,7-disulfonic acid,
2-amino-8-hydroxynaphthalene-6-sulfonic acid,
2-methyl- or 2-ethylamino-8-hydroxynaphthalene-6-sulfonic acid,
2-(N-acetyl-N-methylamino)-8-hydroxynaphthalene-6-sulfonic acid,
2-acetylamino-8-hydroxynaphthalene-6-sulfonic acid,
2-amino-8-hydroxynaphthalene-3,6-disulfonic acid,
2-acetylamino-8-hydroxynaphthalene-3,6-disulfonic acid,
1-amino-5-hydroxynaphthalene-7-sulfonic acid
1-amino-8-hydroxynaphthalene-3,6- or -4,6-disulfonic acid,
1acetylamino-8-hydroxynaphthalene-3,6- or -4,6-disulfonic acid,
1-(4'-aminobenzoylamino)-8-hydroxynaphthalene-3,6- or -4,6-disulfonic acid,
1-(4'-nitrobenzoylamino)-8-hydroxynaphthalene-3,6- or -4,6-disulfonic acid,
1-(3'-aminobenzoylamino)-8-hydroxynaphthalene-3,6- or -4,6-disulfonic acid,
1-(3'-nitrobenzoylamino)-8-hydroxynaphthalene-3,6- or -4,6-disulfonic acid,
2-(4'-amino-3'-sulfophenylamino)-5-hydroxynaphthalene-7-sulfonic acid.

2,4,6-Trifluoro-s-triazine or 2,4,6-trifluoro-1,3,5-triazine (cyanuric fluoride) of the formula (9)

Aminobenzenes of the formula (10)

N-methylaminobenzene,
1-(N-methylamino)-2-methylbenzene,
1-(N-methylamino)-2-ethylbenzene,
1-(N-methylamino)-3-methylbenzene,
1-(N-methylamino)-4-methylbenzene,
1-(N-methylamino)-3-ethylbenzene.

The diazotisation of the amino compounds of the formula (7) is usually effected by treatment with nitrous acid in an aqueous mineral acid solution at low temperature, and the coupling with the coupling components of the formula (8) is carried out at weakly acid or neutral to weakly alkaline pH values.

The condensation reactions of the 2,4,6-trifluoro-1,3,5-triazine with the coupling components of the formula (8) and the aminobenzenes of the formula (10) are carried out preferably in aqueous solution or suspension, at low temperature and at weakly acid or neutral to weakly alkaline pH values, and such that at least one removable fluorine atom remains in the azo dye of the formula (1). Advantageously, the hydrogen fluoride set free during the condensation is neutralised continuously by the addition of aqueous alkali hydroxides, carbonates or bicarbonates.

If the naphthalene radical D and the radical K contain a complex-forming group in the ortho-position to the azo group, for example a hydroxyl or carboxyl group, it is also possible to obtain metal complexes of the azo dyes of the formula (1) by treating the azo compounds obtained by the above described process, wherein, D and K contain a complex-forming group in the ortho position to the azo group, with metal donors, before or after the condensation with the 2,4,6-trifluoro-1,3,5-triazine of the formula (9).

Copper complexes of azo dyes of the formula (1) are of particular interest. A suitable method of metallation, in addition to that referred to above, is also dealkylating metallation and, for obtaining copper complexes, oxidative coppering.

They dyes of the formula (1) are new. They are distinguished by high reactivity and they product dyeings of good wet- and lightfastness properties. To be singled out for special mention is the fact that the dyes containing substantive chromophoric groups have very good solubility and electrolyte solubility properties whilst having a good exhaustion capacity and excellent dye fixation. This is surprising, as the solubility of reactive dyes of comparable type can usually only be improved by the introduction of additional sulfo groups into the dye molecule.

The dyes of the formula (1) are suitable for dyeing and printing a very wide variety of materials, such as silk, leather, wool, polyamide and polyurethane fibres, and especially cellulosic materials of fibrous structure, such as linen, cellulose, regenerated cellulose, and in particular cotton. They are suitable both for the exhaust method and for dyeing by the pad-dyeing process, in which the goods are impregnated with aqueous and, if appropriate, also with salt-containing dye solutions, and the dyes are fixed after treatment with alkali or in the presence of alkali, optionally with or without the application of heat.

They are also suitable for printing, in particular on cotton, and also for printing nitrogen-containing fibres, for example wool, silk or blends containing wool.

It is advisable to rinse the dyeings and prints thoroughly with cold and hot water, if appropriate with the addition of an agent which acts as a dispersant and promotes the diffusion of non-fixed dye.

In the following Examples, the parts and percentages are by weight.

EXAMPLE 1

31 parts of the aminoazo dye of the formula

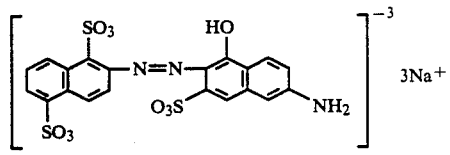

are dissolved in 350 parts of water and the solution is cooled to 0° C. by adding ice. With stirring, 4.53 parts by volume of 2,4,6-trifluoro-1,3,5-triazine are introduced into this solution while keeping the pH of the reaction mixture at 5 to 6 simultaneously adding sodium hydroxide solution. When the condensation is complete, 5.56 parts of N-methylaminobenzene are added and the suspension is stirred at room temperature while keeping the pH of the reaction mixture at 7.5 by adding sodium hydroxide solution. When the reaction is complete, a clear orange solution is obtained, from which the dye is isolated by sprinkling in sodium chloride. The product is dried, affording an orange dyestuff powder, which dyes cellulosic fibres in clear, reddish orange shades.

Further valuable dyes with which dyeings of the indicated shade are produced are obtained by using equivalent amounts of the azo compounds listed in Table 1 instead of the aminoazo dye used in this Example.

TABLE 1

| No. | Aminoazo compound | Shade on cellulose |
|---|---|---|
| 2 | 2-aminonaphthalene-4,8-disulfonic acid → 2-amino-5-hydroxy- | yellowish red |

TABLE 1-continued

| No. | Aminoazo compound | Shade on cellulose |
|---|---|---|
|  | naphthalene-7-sulfonic acid |  |
| 3 | 2-aminonaphthalene-3,6,8-trisulfonic acid → 2-amino-5-hydroxynaphthalene-7-sulfonic acid | scarlet |
| 4 | 2-aminonaphthalene-1,7-disulfonic acid → 2-amino-5-hydroxynaphthalene-7-sulfonic acid | orange |
| 5 | 2-aminonaphthalene-1,5-disulfonic acid → 2-methylamino-5-hydroxynaphthalene-7-sulfonic acid | orange |
| 6 | 2-aminonaphthalene-1,5-disulfonic acid → 2-amino-8-hydroxynaphthalene-6-sulfonic acid | red |
| 7 | 2-aminonaphthalene-1,5-disulfonic acid → 1-(4'-aminobenzoylamino)-8-hydroxynaphthalene-3,6-disulfonic acid | red |
| 8 | 2-aminonaphthalene-1,5-sulfonic acid → 1-(3'-aminobenzoylamino)-8-hydroxynaphthalene-3,6-disulfonic acid | red |
| 9 | 2-aminonaphthalene-1-sulfonic acid → 1-(4'-aminobenzoylamino)-8-hydroxynaphthalene-3,6-disulfonic acid | bluish red |
| 10 | 2-aminonaphthalene-3,6,8-trisulfonic acid → 1-(3'-aminobenzoylamino)-8-hydroxynaphthalene-4,6-disulfonic acid | red |
| 11 | 1-amino-2-hydroxy-6-nitronaphthalene 4-sulfonic acid → 2-methylamino-5-hydroxynaphthalene-7-sulfonic acid, Cu-complex | claret |
| 12 | 2-diazo-1-hydroxynaphthalene-4,8-disulfonic acid → 1-amino-8-hydroxynaphthalene-3,6-disulfonic acid, Cu-complex | blue |
| 13 | 2-aminonaphthalene-3,6,8-trisulfonic acid → 1-amino-3-ureidobenzene | reddish yellow |
| 14 | 2-aminonaphthalene-4,8-disulfonic acid → 1-amino-3-methylbenzene | yellow |
| 15 | 2-aminonaphthalene-5,7-disulfonic acid → 1-amino-3-ureidobenzene | reddish yellow |
| 16 | 2-aminonaphthalene-4,8-disulfonic acid → 1-amino-3-acetylaminobenzene | reddish yellow |
| 17 | 2-aminonaphthalene-4,6,8-trisulfonic acid → 1-amino-3-acetylaminobenzene | reddish yellow |
| 18 | 2-aminonaphthalene-4,6,8-trisulfonic acid → 1-aminonaphthalene-6-sulfonic acid | reddish yellow |
| 19 | 2-aminonaphthalene-6,8-disulfonic acid → 1-amino-2-methoxy-5-methylbenzene | reddish yellow |
| 20 | 2-aminonaphthalene-4,6,8-trisulfonic acid → aminobenzene | yellow |
| 21 | 2-aminonaphthalene-4,8-disulfonic acid → aminobenzene | yellow |
| 22 | 1-aminonaphtalene-2,5,7-trisulfonic acid → 1-amino-3-acetylaminobenzene | reddish yellow |
| 23 | 1-aminonaphthalene-3,6-disulfonic acid → 1-amino-3-acetylaminobenzene | reddish yellow |
| 24 | 2-aminonaphthalene-4,8-disulfonic acid → 1-methylaminonaphthalene-7-sulfonic acid | yellow |
| 25 | 2-aminonaphthalene-5,7-disulfonic acid → 1-(3'-aminophenyl)-3-methylpyrazolone-(5) | yellow |
| 26 | 2-aminonaphthalene-4,8-disulfonic acid → 1-(2'-methyl-3'-amino-5'-sulfophenyl)-3methylpyrazolone-(5) | yellow |

Further valuable dyes with similar colouristic properties are obtained by using an equivalent amount of
1-(N-methylamino)-3-methylbenzene,
1-(N-methylamino)-4-methylbenzene,
1-(N-methylamino)-3-ethylbenzene,
in the above Examples instead of N-methylaminobenzene.

EXAMPLE 27

55.3 parts of the aminoazo dye of the formula

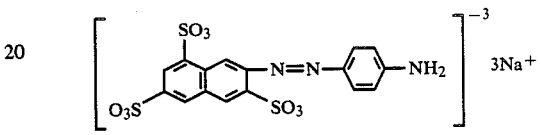

are dissolved in water. To this solution is added a solution of 22.2 parts of 2-(N-methylphenylamino)-4,6-difluoro-1,3,5-triazine in acetone and the reaction mixture is stirred at 20° to 25° C. while continuously neutralising the acid set free during the reaction with sodium carbonate solution at pH 8 to 8.5. When no more starting dye can be detected by chromatography, the resulting solution is evaporated to dryness under reduced pressure after addition of 2.5 parts of anhydrous disodium phosphate.

The resulting dyestuff powder dyes cotton from an aqueous bath in light reddish yellow shades.

EXAMPLE 28

43.8 parts of 1-(4'-aminobenzoylamino)-8-hydroxynaphthalene-3,6-disulfonic acid are dissolved in 500 parts of water at pH 6 with the addition of sodium hydroxide solution. Then 13.8 parts of 2,4,6-trifluoro-1,3,5-triazine are introduced into this solution at 0° C. while simultaneously introducing 50 parts by volume of 2N sodium hydroxide solution. When the addition is complete, 10.7 parts of N-methylaminobenzene are added and the reaction mixture is stirred at pH 5.5 to 6 until it is no longer necessary to add alkali. To the solution of the coupling component is then added a diazo suspension prepared in conventional manner by diazotising 30.3 parts of 2-amino-naphthalene1,5-disulfonic acid and the reaction mixture is neutralised by the gradual addition of sodium hydroxide solution until the pH is 7.5. The dye is precipitated from the resulting deep red solution by addition of sodium chloride. The precipitate is collected by filtration and dried under reduced pressure. The resulting dyestuff powder dyes cotton in fast brilliant red shades.

Further valuable dyes are obtained in analogous manner by reacting, in the sequence of this Example, the diazo components, coupling components and aminobenzenes listed in Table 2, instead of 2-aminonaphthalene-1,5-disulfonic acid, 1-(4'-aminobenzoylamino)-8-hydroxynaphthalene-3,6-disulfonic acid and N-methylaminobenzene.

TABLE 2

| No. | Diazo component | Coupling component | Aminobenzene | Shade on cellulose |
|---|---|---|---|---|
| 29 | 1-aminonaphthalene-sulfonic acid | 1-amino-8-hydroxynaphthalene-4,6-disulfonic acid | 1-(N—methylamino)-4-methylbenzene | red |
| 30 | 2-aminonaphthalene-3,6-disulfonic acid | 2-amino-5-hydroxynaphthalene-7-sulfonic acid | N—methylaminobenzene | orange |
| 31 | 2-aminonaphthalene-1,5,7-trisulfonic acid | 2-amino-8-hydroxynaphthalene-6-sulfonic acid | 1-(N—methylamino)-3-methylbenzene | red |
| 32 | 2-aminonaphthalene-1-sulfonic acid | 1-amino-8-hydroxynaphthalene-3,6-disulfonic acid | 1-(N—methylamino)-3-ethylbenzene | red |
| 33 | 2-aminonaphthalene-sulfonic acid | 2-(4'amino-8'-sulfophenyl-amino)-5-hydroxynaphthalene-7-sulfonic acid | 1-(N—methylamino)-2-methylbenzene | orange |
| 34 | 2-aminonaphthalene-1,5-disulfonic acid | 2-amino-5-hydroxynaphthalene-3,7-disulfonic acid | N—methylaminobenzene | orange |
| 35 | 2-aminonaphthalene-sulfonic acid | 2-amino-5-hydroxynaphthalene-1,7-disulfonic acid | 1-(N—methylamino)-4-ethylbenzene | orange |
| 36 | 2-aminonaphthalene-sulfonic acid | 2-amino-8-hydroxynaphthalene-3,6-disulfonic acid | N—methylaminobenzene | red |
| 37 | 2-aminonaphthalene-4,8-disulfonic acid | 1-(2'-sulfo-4'-aminophenyl)-3-methylpyrazolone | N—methylaminobenzene | yellow |
| 38 | 2-aminonaphthalene-1,5-disulfonic acid | 2-methylamino-5-hydroxy-naphthalene-7-disulfonic acid | N—methylaminobenzene | orange |
| 39 | 2-aminonaphthalene-sulfonic acid | 1-amino-8-hydroxynaphthalene-4,6-disulfonic acid | N—methylaminobenzene | red |

EXAMPLE 40

21.9 parts of 1-(3'-aminobenzoylamino)-8-hydroxynaphthalene-4,6-disulfonic acid are dissolved in water at pH 6 with the addition of sodium hydroxyde solution. To this solution are added 6.9 parts of 2,4,6-trifluoro-1,3,5-triazine at 0° C. while uniformly adding 50 parts by volume of 2N sodium hydroxide solution to neutralise the acid set free during the reaction. Then a diazo suspension prepared in the conventional manner by diazotisation of 15 parts of 2-aminonaphthalene-4,7-disulfonic acid id added to the condensation product and the reaction mixture is stirred at pH 5 to 6 until the coupling is complete. Then 5.4 parts of N-methylamino-benzene are added, the batch is warmed to 30° C. and the pH is kept at 7 to 7.5 by adding sodium hydroxide solution until the condensation reaction is complete. The dye of the formula

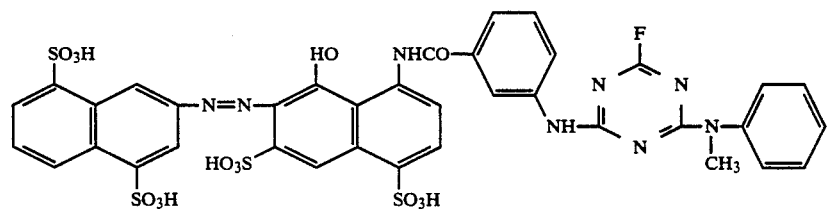

is precipitated from the resulting solution by adding a mixture of sodium chloride and potassium chloride, collected by filtration and dried. It dyes cotton in a bluish red shade.

EXAMPLE 41

25.3 parts of 2-methylamino-5-hydroxynaphthalene-7-sulfonic acid together with a suspension of 22.2 parts of 2-(N-methylphenylamino)-4,6-difluoro-1,3,5-triazine in water are stirred at room temperature, while neutralising the acid set free during the reaction, at a pH value of 5.5 to 6 until a clear solution is obtained and no more starting material can be detected. A diazo suspension prepared in the conventional manner by diazotising 30.3 parts of 2-aminophthalene-1,7-disulfonic acid is added and coupling is carried out at a pH value of 7 to 7.5. The dye is precipitated from the orange solution by adding sodium chloride. The resulting product of the formula

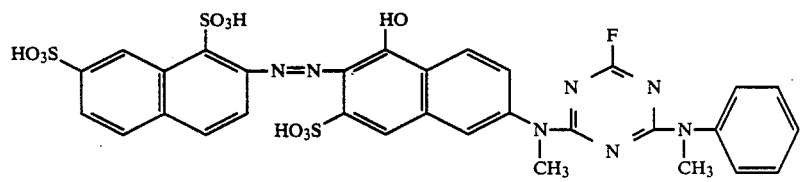

dyes cotton in a reddish orange shade.

Dyeing Procedure I 2 parts of the dye obtained in Example 1 are dissolved in 100 parts of water while adding 0.5 part of sodium m-nitrobenzenesulphonate. A cotton fabric is impregnated with the resulting solution to a liquor pick-up of 75% and then dried.

The fabric is then impregnated with a warm solution of 20° C. which contains, per liter, 5 g of sodium hydroxide and 300 g of sodium chloride, and squeezed out to a pickup of 75%. The dyeing is steamed for 30 seconds at 100° C. to 101° C., rinsed, soaped for a quarter of an hour in a 0.3% boiling solution of a non-ionic detergent, rinsed and dried.

Dyeing Procedure II 2 parts of the dye obtained in Example 1 are dissolved in 100 parts of water. The solution is added to 1900 parts of cold water, 60 parts of sodium chloride are added and 100 parts of cotton fabric are put into this dyebath. The temperature is raised to 40° C. and 40 parts of calcined sodium carbonate and another 60 parts of sodium chloride are added after 30 minutes. The temperature is kept for 30 minutes at 40° C. The dyeing is rinsed and the soaped for 15 minutes in a 0.3% boiling solution of a non-ionic detergent, rinsed and dried.

What is claimed is:

1. The azo dye of the formula

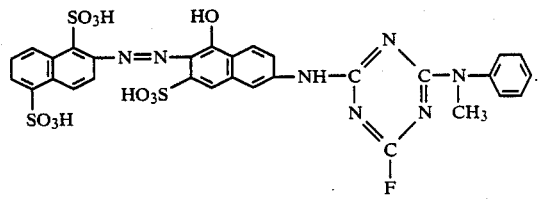

2. The azo dye of the formula

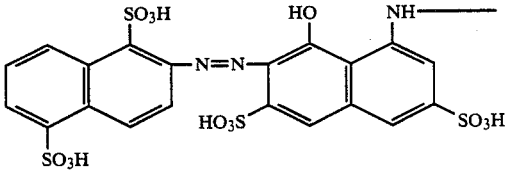

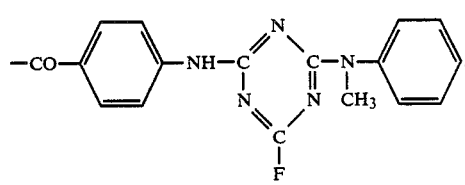

3. The azo dye of the formula

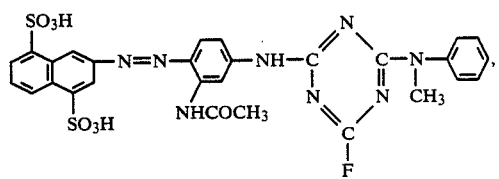

* * * * *